United States Patent [19]

Utagawa et al.

[11] Patent Number: 4,816,663

[45] Date of Patent: Mar. 28, 1989

[54] CAMERA SYSTEM WITH VIGNETTING CALCULATION AND MEMORY MEANS

[75] Inventors: Ken Utagawa, Kawasaki; Kunihisa Hoshino, deceased, late of Tokyo, both of Japan, by Chie Hoshino, legal representative

[73] Assignee: Nikon Corporation, Tokyo, Japan

[21] Appl. No.: 30,990

[22] Filed: Mar. 27, 1987

[30] Foreign Application Priority Data

Mar. 31, 1986 [JP] Japan .................................. 61-73271

[51] Int. Cl.⁴ .................................................. G01J 1/20
[52] U.S. Cl. ...................................... 250/201; 354/402
[58] Field of Search ................ 250/201, 204; 354/402, 354/406, 407, 408

[56] References Cited

U.S. PATENT DOCUMENTS

| | | | |
|---|---|---|---|
| 4,185,191 | 1/1980 | Stauffer | 250/204 |
| 4,264,810 | 4/1981 | Utagawa et al. | 250/204 |
| 4,322,616 | 3/1982 | Fukuhara et al. | 250/204 |
| 4,443,078 | 4/1984 | Niwa et al. | 354/402 |
| 4,460,260 | 7/1984 | Utagawa | 250/201 |
| 4,473,287 | 9/1984 | Fukuhara et al. | 354/402 |
| 4,531,835 | 7/1985 | Oinoue | 250/201 |
| 4,561,749 | 12/1985 | Utagawa | 354/406 |
| 4,670,645 | 6/1987 | Ohtaka et al. | 250/201 |
| 4,687,917 | 8/1987 | Kusaka et al. | 250/201 |
| 4,690,537 | 9/1987 | Ando | 354/402 |

Primary Examiner—David C. Nelms
Assistant Examiner—Michael Messinger
Attorney, Agent, or Firm—Shapiro and Shapiro

[57] ABSTRACT

In an apparatus for detecting the in-focus state of a photo-taking lens of a camera, a defocus signal is produced responsive to a light intensity distribution signal and is indicative of deviation between an image of an object to be photographed and a predetermined surface. An information signal is produced indicative of the effectiveness of the defocus signal. A vignetting detection signal is produced indicative of the state of vegnetting by the photo-taking lens. The information signal is compared with a threshold value to determine the effectiveness of the defocus indicated by the defocus signal, and the threshold value is changed in response to the vignetting detection signal. A photo-taking lens may include a memory that stores data indicating an inverse of a value indicative of a distance from a predetermined plane to an exit pupil of the photo-taking lens, and the data stored in the memory may be used for calculating vignetting.

21 Claims, 7 Drawing Sheets

CAMERA SYSTEM WITH VIGNETTING CALCULATION AND MEMORY MEANS

BACKGROUND OF THE INVENTION

1. Field of the Invention

This invention relates to a camera system having a focus detecting apparatus which mitigates the influence of vignetting.

2. Description of the Related Art

As the focus detecting apparatus of a TTL camera, there are known so-called pupil division type automatic focus detecting apparatus for detecting the focus-adjusted state of a photo-taking optical system from the relative amount of displacement of a plurality of object images produced by light beams coming from different areas of the pupil of the photo-taking optical system.

For example, U.S. Pat. No. 4,185,191 discloses an automatic focus detecting apparatus of this type constituted by a pair of arrays, i.e., a lens array disposed near a primary image surface and a light-receiving element array disposed immediately rearwardly thereof.

Also, U.S. Pat. No. 4,264,810 discloses an automatic focus detecting apparatus of this type constituted by a field lens disposed on a primary image surface, two re-imaging lenses for re-imaging on a secondary image surface the image formed on the primary image surface, and two image sensor arrays disposed on the secondary image surface.

However, such pupil division type automatic focus detecting apparatus according to the prior art have suffered from the following disadvantage.

In the automatic focus detecting apparatus of this type, the pupil of a predetermined F-number is specified on a plane orthogonal to a predetermined position on the optic axis by the optical system on the focus detection side and therefore, even if the F-number of the exit pupil is greater than said predetermined F-number or the F-number of the exit pupil is equal to or smaller than said predetermined F-number, when an interchangeable lens having an exit pupil position different from said predetermined position is mounted on a camera body having said automatic focus detecting apparatus, vignetting is sometimes produced in the focus detecting light beam by the exit pupil, and when the vignetting becomes non-uniform on the image surface of the focus detecting optical system side, the image of the object to be photographed is distorted and thus, it has been impossible to accomplish accurate focus detection.

SUMMARY OF THE INVENTION

It is the object of the present invention to provide a camera system having an automatic focus detecting apparatus which mitigates the influence of vignetting produced between a photo-taking lens and a focus detecting optical system.

According to the present invention, information regarding the exit pupil position is stored in memory means contained in an interchangeable photo-taking lens, this information is read out on the body side as required and the amount of vignetting is estimated, whereby the accurate amount of vignetting can be grasped irrespective of the object to the photographed, thus enhancing the focus detection accuracy.

DESCRIPTION OF THE PREFERRED EMBODIMENT

The principle of the present invention will hereinafter be described in detail with reference to FIGS. 1A and 1B.

Figures 1A, 1B:
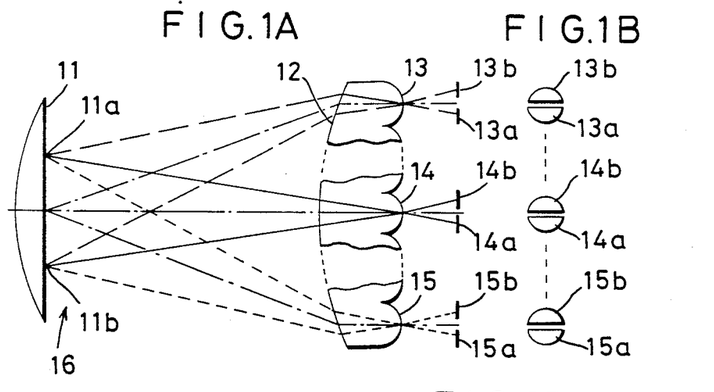
FIGS. 1A and 1B are cross-sectional views of a focus detecting optical system according to the prior art.

FIG. 1A is a schematic side view of the apparatus, and FIG. 1B is a front view of photoelectric converting elements.

A field lens 12 is disposed rearwardly of a photo-taking lens 11, a plurality of minute lenses 13, 14, 15, . . . are disposed near the rear focal plane of the field lens 12, and pairs of light-receiving portions 13a, 13b; 14a, 14b; 15a, 15b; . . . which are photoelectric converting elements are disposed rearwardly of the minute lenses 13, 14, 15, . . . correspondingly thereto.

In the light-receiving portions, the row a designated by the suffix a of the reference numerals and the row b designated by the suffix b of the reference numerals form image sensor arrays, respectively, and the curvature of each minute lens is so formed that the position of the light-receiving portion which is the pair of photoelectric converting elements rearward of each minute lens and the position of the exit pupil of the photo-taking lens 11 are substantially conjugate with each minute lens. Also, as regards the field lens 12, it is necessary to more sharply bend the optical paths of the minute lenses near the upper and lower ends as viewed in FIG. 1A, and the curvature of the minute lenses is determined so that when the exit pupil of the photo-taking lens 11 is at a predetermined position 16, the images of the light-receiving surfaces of each pair of photoelectric converting elements exist while completely overlapping each other on the exit pupil, that is, the images of the light-receiving portions 13a, 14a, 15a, . . . exist at the position 11a on the phototaking lens 11 while overlapping one another and the images of the photoelectric converting elements 13b, 14b, 15b, . . . exist at the position 11b on the photo-taking lens 11 while overlapping one another (hereinafter, the position at which the images of the light-receiving portions which are the photoelectric converting elements formed by the focus detecting optical system such as the field lens 12 and minute lenses 13 overlap one another will be referred to as the set pupil position).

In the present automatic focus detecting apparatus, focus detection can be effectively accomplished only when the light beam used for focus detection is hardly vignetted by the exit pupil of the photo-taking lens, i.e., only for a lens in which the influence of vignetting uniformly occurs on the detecting element because the position of the exit pupil is equal to said set position even if the lens has a great F-number.

Considering, for example, the case of 35 mm single lens reflex cameras, the positions of the exit pupils of interchangeable lenses which are photo-taking lenses are multifarious, say, of the order of 50 mm to 400 mm or more from the focal plane, and the F-number thereof also ranges from the order of F1 or F2 to F11 or more.

If, in an automatic focus detecting apparatus corresponding to that of FIG. 1A, the set pupil position 16 is designed to a point of 100 mm from the focal plane (hereinafter, the spacing between the set pupil position and the focal plane is represented by PO, and accordingly, in this case, PO=100 mm) and the expanse of the light beam used for detection, i.e., the expanse of the detecting light beam restricted by the shape of the light-receiving portions 13a, 13b; 14a, 14b; 15a, 15b; . . . , is designed to F4, the detection accuracy of the automatic focus detecting apparatus will be markedly reduced regarding interchangeable lenses in which F-number is darker than F4 and the spacing between the position of the exit pupil and the focal plane (such spacing is hereinafter represented by PO') is not 100 mm.

FIGS. 2A–2F illustrate the manners and degrees of vignetting by various photo-taking lenses in contrast with each other, and show the cases where the brightness of the photo-taking lenses is F6 and PO'=100 mm, 50 mm, ∞ when with regard to said design value, the expanse of the detecting light beam is F4 and the position of the set pupil is PO=100 mm.

Figure 2A:
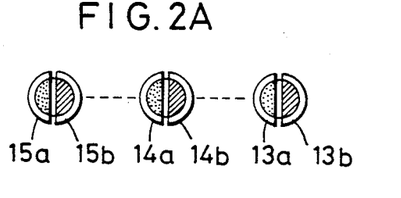
FIGS. 2A to 2F are diagrammatic views showing the states of vignetting.

FIG. 2A refers to the case where PO'=100 mm. The light beam passed through the pupil of F6 of the photo-taking lens is equally allotted to the light-receiving portions 15a, 15b; 14a, 14b; . . . which are photoelectric converting elements receiving the light beam of expanse F4 without being one-sided to the pairs of light-receiving portions 15a, 15b; 14a, 14b; . . . Accordingly, where the object to be photographed is of uniform brightness, the outputs 15al, 15bl, 14al, . . . of the respective light-receiving portions 15a, 15b, 14a, . . . are uniform as shown in FIG. 2D. That is, in such case, detection accuracy is not reduced in spite of the presence of vignetting. That is, the deviation between two images can be detected by the row of the pairs of photoelectric converting elements.

Figure 2B:
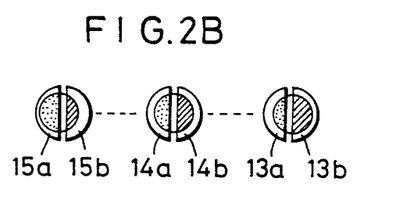

FIG. 2B refers to the case where PO'=50 mm. In this case, the light beam passed through the pupil of F6 of the photo-taking lens as mentioned previously is distributed to each pair of light-receiving portions at different ratios. Consequently, the outputs of the light-receiving portions at this time remarkably differ from one another as shown in FIG. 2E although they should originally be equal to one another.

Figure 2C:
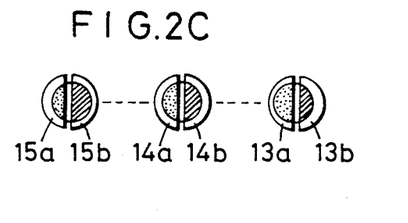
Figure 2D:
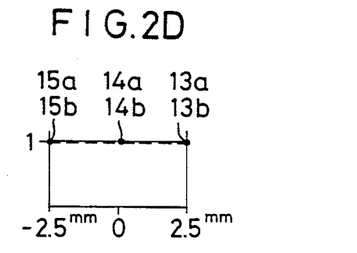
Figure 2E:
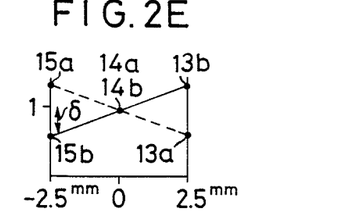

Finding the degree δ of eclipse of FIG. 2E with respect to the case where the minute lenses 13 and 15 at the opposite ends are at the positions of +2.5 mm and −2.5 mm, respectively, from the central minute lens 14, δ is as great as δ=0.3 with 1 as the average. That is, the photoelectric outputs of the photoelectric converting elements forming each pair become greatly different from each other due to the vignetting in spite of the uniform brightness of the object to be photographed, and under such a situation, it is very difficult to detect the deviation between two images by a pair of photoelectric converting elements.

Figure 2F:
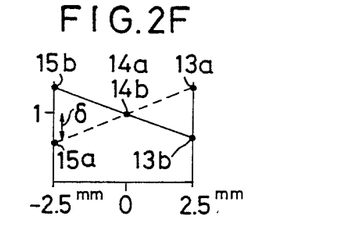

FIG. 2C refers to the case where PO'=∞. The vignetting in this case is entirely converse to that in the cases of FIGS. 2B and 2E. That is, the photoelectric outputs for the object to be photographed having uniform brightness are as shown in FIG. 2F, and the degree δ of vignetting is δ≈0.3 at the positions of ±2.5 mm. That is, as in the case of FIG. 2B, the photoelectric outputs of the row of the pairs of photoelectric converting elements become greatly different from one another due to vignetting in spite of the uniform brightness of the object to be photographed, and it becomes very difficult to detect the deviation between two images.

To overcome the above-noted disadvantages, the applicant proposes in U.S. Application Ser. No. 661,456 filed Oct. 16, 1984, now U.S. Pat. No. 4,687,917 issued Aug. 18, 1987, a focus detecting apparatus provided with vignetted state detecting means for detecting the vignetted state of an image formed by a focus detecting optical system by a pair of outputs put out from image sensors and outputting a signal corresponding to that state.

In this system, the vignetted state is directly found from the outputs of the image sensors and therefore, for objects to be photographed which satisfy special conditions such as objects to be photographed having nearly uniform intensity of illumination, the vignetted state can be detected highly accurately. However, where the object to be photographed has a complicated brightness distribution, the pattern of the outputs of the image sensors is also complicated and moreover, the image position regarding a pair of image outputs differs depending on the amount of defocus and therefore, even various contrivances could not always detect the accurate degree of vignetting.

According to the present invention, the information about the position of the exit pupil is stored in memory means contained in an interchangeable photo-taking lens, this information is read out on the body side as required and the accurate amount of vignetting can be grasped by estimating the amount of vignetting irrespective of any object to be photographed, thus enhancing the accuracy of focus detection.

Figure 3:
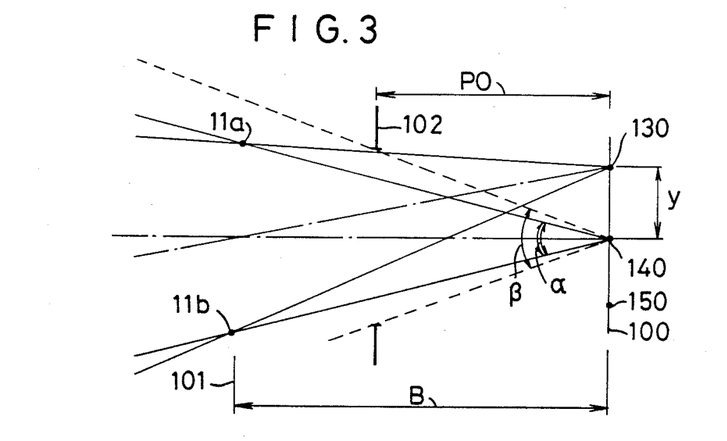
FIG. 3 is an optical path illustration equivalent to FIG. 1A.

The relation between the position of the exit pupil and the vignetting will first be described. FIG. 3 corresponds to FIG. 1A. Let it be assumed that the image in the range of image height of ±h from the on-axis point 140 on a predetermined detecting surface 100 located near a position optically equivalent to a film surface (the range from point 130 to point 150) is to be processed to effect focus detection. Points 130, 140 and 150 substantially correspond to the positions of the minute lenses 13, 14 and 15, respectively, in FIG. 1A, and where the pupil dividing optical system is a re-imaging optical system comprising a pair of re-imaging lenses as shown in Japanese Laid-Open Patent Application No. 78101/1983, the position of a field lens placed near the position optically equivalent to the film surface corresponds to the position of the predetermined detecting surface 100 in FIG. 3, and the image detection range thereon corresponds to the range of point 130 to point 150.

Irrespective of the position on the predetermined detecting surface, the point at which the detecting pupils (the pupils used for detection) overlap with each other in a plane perpendicular to the optic axis is the point 11a of FIG. 3 which is the same as the point 11a of FIG. 1A, and the aforementioned set pupil position is determined as a plane perpendicular to the optic axis of the photo-taking lens and passing through the point 11a. The distance between the set pupil position and the predetermined detecting surface is B. Also, the distance between the exit pupil position 102 of the photo-taking lens and the predetermined detecting surface 100 is PO. In FIG. 3, the angle α formed by the points 11a, 140 and 11b is the angle of opening of the light beam used for focus detection, and in the lenslet array type focus detecting optical system of FIG. 1A, the magnitude of this angle is determined by the sizes of the light-receiving elements 13a, 13b, ..., 15a, 15b, and in the case of the aforementioned re-imaging optical system, it is determined by the size of the pupil of the re-imaging optical system.

If the F-value corresponding to the angle of opening α of the focus detecting light beam is $F_{AF}$, $F_{AF} \approx 1/\alpha$ (α is the radian unit).

When the exit pupil position of the photo-taking lens is equal to the set pupil position, no vignetting occurs in bright lenses wherein the F-value is smaller than the value of $F_{AF}$; however, when the exit pupil position differs from the set pupil position, vignetting begins to occur at the point 130 of image height h as shown in FIG. 3 even in photo-taking lenses of open F-value somewhat smaller than $F_{AF}$. In such case, if the limit F-value for which vignetting begins to occur is represented by $F_{lim}$ ($F_{lim} \approx 1/\beta$), the following relation is generally established:

$$\frac{1}{F_{lim}} = \frac{1}{F_{AF}} + 2h \left| \frac{1}{PO} - \frac{1}{B} \right| \quad (1)$$

This equation means that as the image height h is greater and as the exit pupil position of the photo-taking lens is more distant from the set pupil position, the limit F-value for which vignetting begins to occur becomes smaller and only brighter lenses can be used.

Also, as a parameter $V_{ig}$ which reflects the amount of eclipse, the following amount may be used, where $F_O$ is the open F-value of the photo-taking lens.

(i) $F_O \leq F_{lim}$    $V_{ig} = O$ (ii) $F_{lim} < F_O \leq F_{AF}$ $$V_{ig} = F_{AF} \times \left( \frac{1}{F_{lim}} - \frac{1}{F_O} \right) = \left( 1 - \frac{F_{AF}}{F_O} \right) + 2hF_{AF}$$

$$\left| \frac{1}{PO} - \frac{1}{B} \right|$$

(iii) $F_{AF} < F_O$ $$V_{ig} = F_O \times \left( \frac{1}{F_{lim}} - \frac{1}{F_O} \right) = \left( \frac{F_O}{F_{AF}} - 1 \right) + 2hF_O$$

$$\left| \frac{1}{PO} - \frac{1}{B} \right|$$

(2)

In $V_{ig}$, the term which does not depend on h shows the amount of vignetting which does not depend on the position of the image height, and the term which depends on h reflects the magnitude of vignetting shown in FIGS. 2E and 2F. The magnitude of the influence imparted to the focus detection error by the influence of the vignetting differs depending on the algorithm of detection. That is, the influence of the vignetting is varied by using two different digital filters as described hereinafter. Accordingly, expression (2) may be intactly used as the parameter of the vignetting, but alternatively, only the term proportional to h may be used. $V_{ig} = 0$ indicates that there is no vignetting.

As described above, the presence and magnitude of the vignetting can be known from the exit pupil position and open F-value of the photo-taking lens. In this case, as is clear in the development of the foregoing expression, the exit pupil position appears in the form of the inverse number of PO and therefore, in the present embodiment, the photo-taking lens data is recorded in the form of the inverse number, i.e., the value of 1/PO.

Also, where a telecon or the like is mounted on the camera, there is an advantage that when the composite pupil position of the master lens and the telecon is to be found, the form of 1/PO leads to an easier operation expression.

With respect also to the influence of the vignetting by the exit pupil position of the photo-taking lens regarding the detecting light beam in a case such as photometering rather than focus detection, the form of the inverse number fits well. That is, even for the same difference of 25 mm, there is no great difference in the influence imparted to photometering and distance measurement by the influence of the vignetting between PO=400 mm and PO=425 mm, but there is a great difference in said influence between PO=25 mm and PO=50 mm. This is because the angle β subtending the opening portion is proportional to 1/PO and the magnitude of the vignetting also substantially depends on β, and accordingly, it is preferable that the exit pupil position information be also stored in the form of 1/PO.

Figure 4:
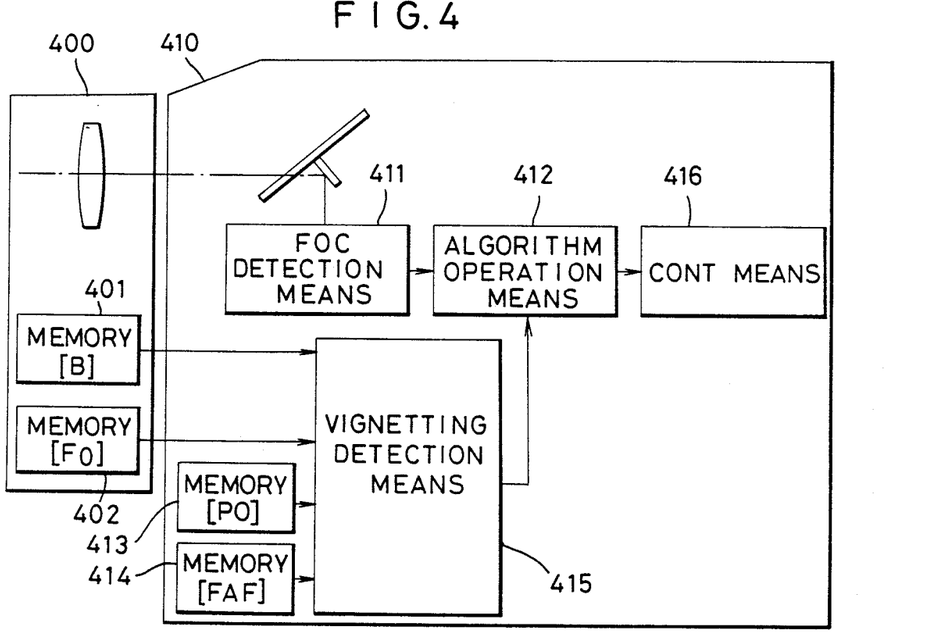
FIG. 4 is a block diagram showing the construction of the present invention when an interchangeable photo-taking lens is mounted on a camera body.
Figure 5:
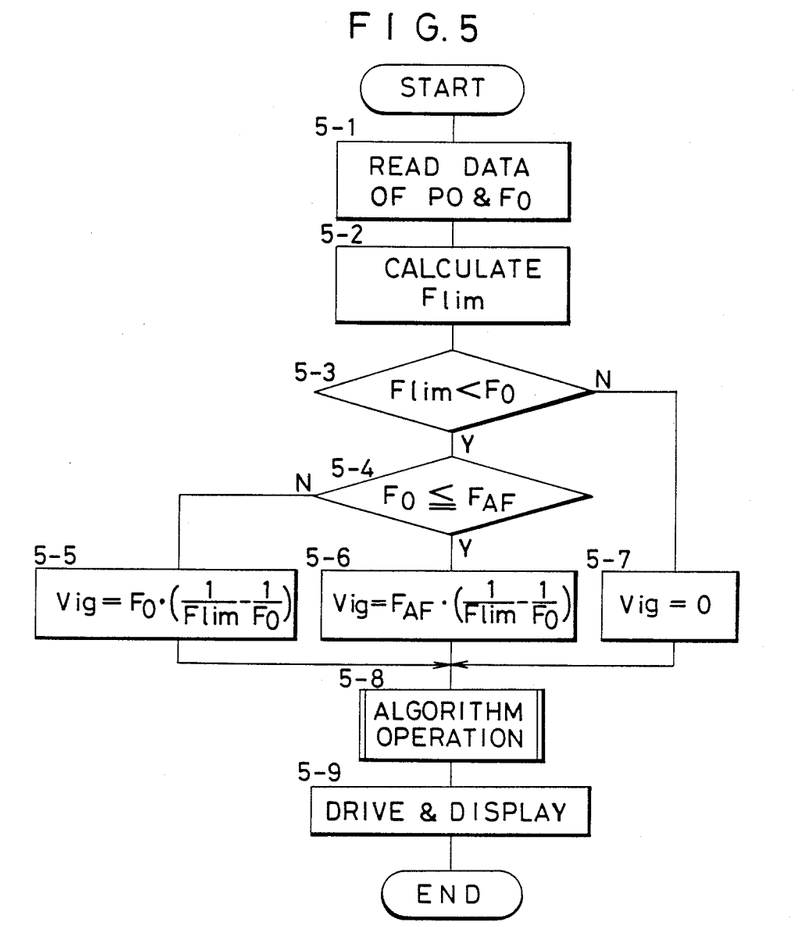
FIGS. 5 and 6 are flow charts of vignetting processing.

The actual flow for calculating the amount of vignetting will now be described with reference to FIGS. 4 and 5. In FIG. 5, parts of focus detection means 411, vignetting detection means 415 and algorithm operation means 412 are constituted by a microcomputer. At step 5-1 of FIG. 5, the exit pupil position information [B] and the open F-value information [$F_O$] are read by the vignetting detection means 415 on the body 410 side from first and second memory means 401 and 402 contained in the photo-taking lens 400 of FIG. 4. The body 410 further includes therein third memory means 413 storing the set pupil position information [PO] of the focus detecting apparatus therein and fourth memory means 414 storing therein the F-value information [$F_{AF}$] corresponding to the angle of opening of the detecting light beam, and the vignetting detection means 415 calculates by equation (1) the $F_{lim}$ which is the limit F-value for the occurrence of vignetting, from information [B], [$F_O$], [PO], [$F_{AF}$] and h. h is an inherent value predetermined by the focus detecting optical system and is prestored in the vignetting detection means. Subsequently, at step 5-3, the vignetting detection means compares the previously read open F-value $F_O$ of the photo-taking lens with $F_{lim}$, and if $F_{lim} \geq F_O$, no vignetting occurs and therefore, the parameter $V_{ig}$ of vignetting is rendered into O. If $F_{lim} < F_O$, vignetting may occur and at step 5-4, the magnitudes of $F_O$ and $F_{AF}$ are compared. If $F_O \leq F_{AF}$, the parameter of vignetting is calculated in accordance with (ii) of expression (2), and if $F_{AF} < F_O$, the parameter $V_{ig}$ of vignetting is calculated in accordance with (iii) of expression (2).

The vignetting detection means 415 transmits to algorithm operation means 412 the parameter $V_{ig}$ reflecting the magnitude of the amount of vignetting thus calculated (step 5-8). The algorithm operation means 412 processes a pair of image data sent from the focus detection means 411 and calculates the amount of deviation between the two images, and transmits it to control means 416 at step 5-9. The control means 416 drives the optical system of the photo-taking lens 400 in accordance with the amount of defocus and displays the in-focus state. Here, the algorithm of the processing when the amount of defocus is processed from the pair of image data is changed by the parameter $V_{ig}$ of vignetting.

What processing is possible in conformity with vignetting is described, for example, in U.S. application Ser. No. 661,456 filed Oct. 16, 1984, and a method of changing over the algorithm of the processing is to change over a filter. That is, vignetting brings about to the object image an influence having a very low-order spatial frequency component mixed therewith and therefore, when vignetting occurs, a filter from which a DC component has been eliminated is used to effect image processing, and then detection of the image deviation is effected.

Further, even when the same filter is used, it is preferable to change the threshold value for determining the result as effective depending on the magnitude of the amount $V_{ig}$ of vignetting. That is, if the amount of information about the object to be photographed is great, a correct result will be obtained even if more or less vignetting occurs, whereas if the amount of information about the object to be photographed is small, a focus detection result including a great error will be provided when vignetting occurs. This amount of information corresponds to the contrast and brightness of the object to be photographed. So, it is preferable to provide a predetermined threshold value correspondingly to the magnitude of $V_{ig}$ and determine the focus detection result as effective when the amount of information about the object to be photographed is greater than the predetermined threshold value. As such amount of information about the object to be photographed, use may be made, for example, of the parameter E of U.S. Pat. No. 4,561,749. This parameter E corresponds to the maximum value of the absolute value of the inclination of a correlative function C(L) to be described. There are various methods of finding the degree of sharpness, but for example, a method of finding the sum of the absolute values of adjacent differences is used most often.

It has been described that the information of the exit pupil position stored inn the lens should preferably be in the form of an inverse number, but actually it is suitable to store it in the form of 8-bit data and therefore, the range of value is 0–255. The exit pupil positions of most photo-taking lenses are irregular within the range of PO=40 mm–400 mm, and it is preferable to use the form of $\gamma$/PO as the specific form of expression of the exit pupil position information and restrict the value of $\gamma$ to a suitable value within the range of 400–10000. In a lens such as a macrolens in which the amount of axial movement is great, the exit pupil position is greatly varied by the amount of axial movement and therefore, it is preferable that the amount of axial movement be divided into zones and an optimum exit pupil position be entered for each zone and selected by a conventional encoder.

A description will now be given of the specific substance of detecting the amount of vignetting and changing over the algorithm of processing. Also, as regards the camera body containing a focus detecting apparatus therein, a case where not only a new lens having the exit pupil position information stored therein as described above but also a conventional lens having no such lens data is mountable is conceivable, and in that case, it is also necessary to effect the processing of the conventional lens and therefore, a description will hereinafter be given of a second embodiment, including such case.

Where a conventional lens, i.e., an interchangeable lens in which no lens data is contained, is mounted on a camera body in which the focus detecting apparatus of the present invention is incorporated, a flag for discriminating the presence or absence of lens data (hereinafter referred to as the lens data flag) is provided to cause it to be reflected in the processing algorithm.

Figure 6:
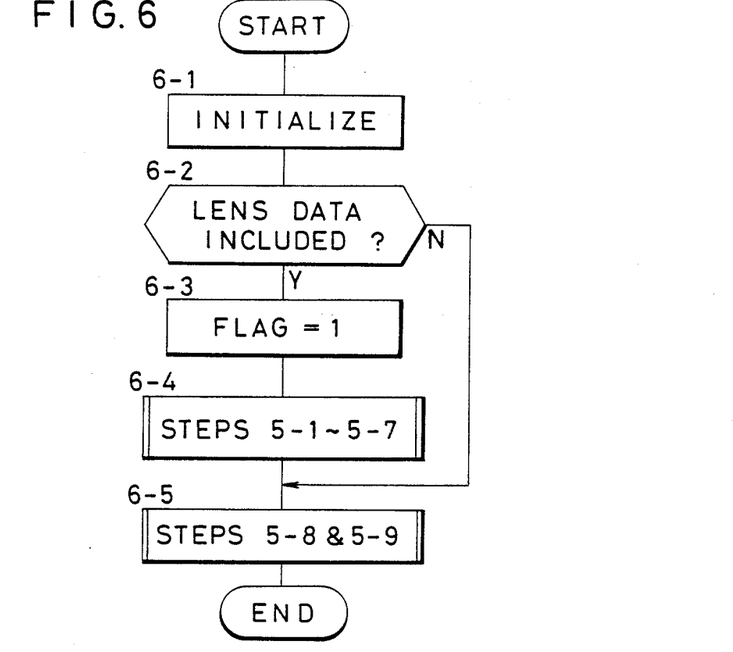

The flow chart of FIG. 6 will be described. Step 6-1 is a initialization step, and more specifically, at this step, the lens data flag to be described is reset. At step 6-2, whether the mounted interchangeable lens has the exit pupil position information [B] and the open F-value information [$F_O$] is determined, and if it has, the lens data flag is set to 1 at step 6-3. Steps 6-4 and 6-5 are the same as the steps 5-1 to 5-7, 5-8 and 5-9 of FIG. 5 and therefore need not be described.

Figure 7A:
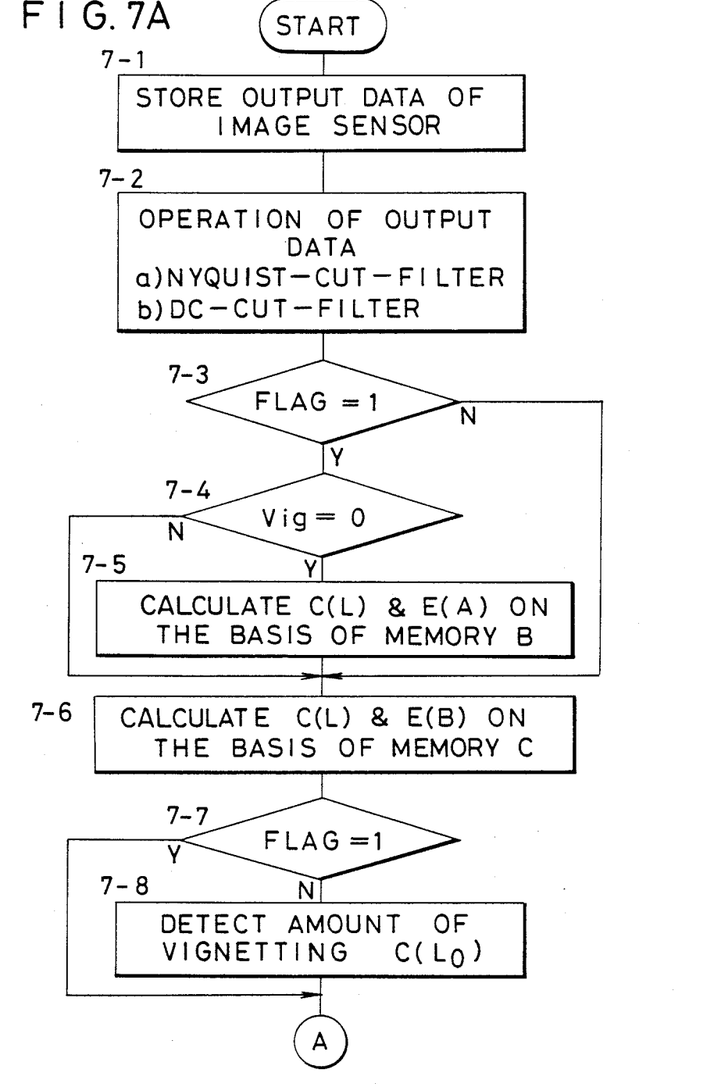
FIGS. 7A and 7B are flow charts showing the subroutine of FIG. 6.
Figure 7B:
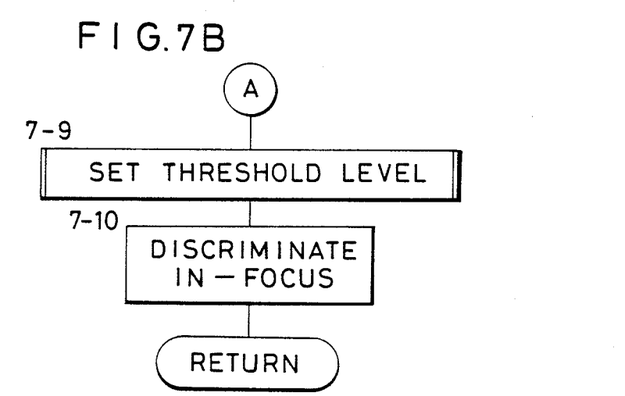
Figure 8A:
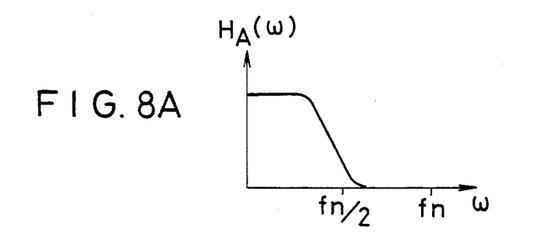
FIGS. 8A and 8B are graphs showing filter characteristics.
Figure 8B:
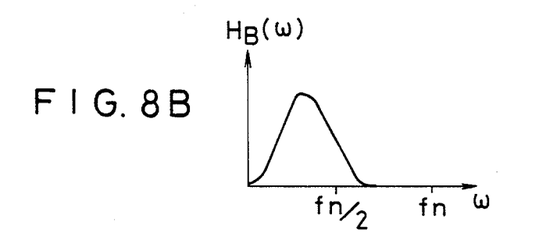

An example in which the algorithm of processing is changed over depending on the amount of vignetting will now be described with reference to FIGS. 7A and 7B. At step 7-1, the image output from the image sensor is stored in an internal memory A. Then, at step 7-2, the stored image output is subjected to the filter processing. Here, a Nyquist-cut-filter for cutting Nyquist frequency and greater frequency components to a predetermined sample pitch is effected to suppress any high frequency component unsuitable for the image deviation detection from the output of the image sensor, whereafter the data of said predetermined sample pitch is stored in an internal memory B. A DC-cut-filter for eliminating any DC component is effected, whereafter the image data is stored in an internal memory C. As regards the frequency characteristics of these filters, FIG. 8A shows the characteristic of the Nyquist-cut-filter, and FIG. 8B shows the characteristic of the DC-cut-filter. Subsequently, at step 7-3, the presence or absence of the lens data (the exit pupil position and the open F-value) is judged. When the lens data is present and flag=1, the program proceeds to step 7-4, where the presence or absence of vignetting is determined, and if vignetting is absent ($V_{ig}=0$), at step 7-5, conventional operations of the correlative function C(L) and information amount E(A) are effected to calculate the amount of image deviation between the pair of image outputs relative to the data in the internal memory B. Subsequently, at step 7-6, operations of the correlative function C(L) and information amount E(B) for calculating the amount of image deviation are effected also for the data from which the DC component of the internal memory C has been eliminated. If at step 7-4, vignetting is present ($V_{ig}\neq 0$) and if at step 7-3, lens data flag$\neq$1, step 7-6 is directly executed. Steps 7-7 and 7-8 are a loop for finding the approximate amount of vignetting from the output of the image sensor when a photo-taking lens having no data of the exit pupil position is mounted on the camera body. Subsequently, at step 7-9, the threshold value of in-focus decision is set in conformity with the presence or absence of vignetting and with the amount of vignetting, namely, in conformity with the value of $V_{ig}$. At step 7-10, the magnitudes of the information amounts E(A) and E(B) calculated at steps 7-5 and 7-6 are compared with the set threshold value, and when the information amounts exceed said threshold value, it is determined that the operated amount of image deviation is proper, and the amount of defocus is calculated from this amount of image deviation by a conventional method. Finally, at step 7-11, the display of the in-focus state of the photo-taking lens and the driving of the photo-taking lens are effected on the basis of the calculated amount of defocus. In the manner described above, the change-over of the filter and the changing of the threshold value are effected depending on the amount $V_{ig}$ of vignetting and therefore, even when vignetting occurs, accurate focus detection is possible.

Step 7-8 for detecting the amount $V_{ig}$ of vignetting from the outputs of a pair of image sensors will now be described with reference to FIGS. 9A and 9B. To make the description readily understandable, it is assumed here that the interchangeable lens mounted on the camera body is in the in-focus state.

Figure 9A:
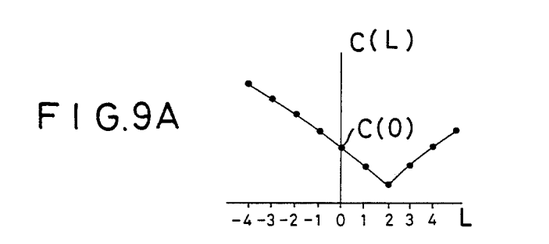
FIGS. 9A and 9B are graphs in which the variation in the correlative amount resulting from image shifting is plotted.

FIG. 9A is a graph in which from a data row A ($a_1$, $a_2$, $a_3$, ..., $a_i$, ...; $b_1$, $b_2$, $b_3$, ..., $b_i$, ...) stored in the internal memory B, the correlative value C(L) when the correlative operation processing of the following equation (3) is effected is plotted with the shift number L as a parameter.

$$C(L) = \sum_i |a_i - b_i + L| \quad (3)$$

Here, $a_1$, $a_2$, ..., $a_i$ correspond to the outputs of the light-receiving portions 13a, 14a, 15a, ..., and $b_1$, $b_2$, ..., $b_i$ correspond to the outputs of the light-receiving portions 13b, 14b, 15b, .... When there is no vignetting, the image pattern indicated by $a_1$, $a_2$, ..., $a_i$ in the in-focus state and the image pattern indicated by $b_1$, $b_2$, ..., $b_i$ are originally just identical to each other and therefore, the shift number L=0 and the correlative value C(0) is minimum. If the correlative value C(L) which provides a maximum correlation is $C_{min}$, $C_{min}=C(0) \approx 0$.

However, when vignetting occurs, the shift number L which provides the maximum correlation $C_{min}$ is not always L=0 as shown in FIG. 9A, and as the vignetted state becomes greater, the shift number L generally deviates more greatly from 0. This means that focus detection is not effected accurately due to vignetting.

Figure 9B:
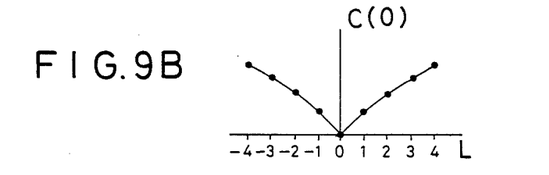

FIG. 9B is a graph in which from a data row B ($a_1'$, $a_2'$, $a_3'$, ..., $a_i'$; $b_1'$, $b_2'$, $b_3'$, ..., $b_i'$, ...) stored in the internal memory C, the correlative operation processing of equation (3) is effected, and $a_1'$, $a_2'$, ... $a_i'$ correspond to the outputs of the light-receiving portions 13a, 14a, 15a, ..., and $b_1'$, $b_2'$, ..., $b_i'$ correspond to the outputs of the light-receiving portions 13b, 14b, 15b, .... In the data row B, the vignetting pattern which is a very low-order frequency component is eliminated by the DC-cut-filtering and therefore, the shift number L which provides the maximum correlation amount $C_{min}$ is approximately L≃0, which indicates that focus detection is effected accurately. Now, here, C(0) in FIG. 9A is used as what provides the amount $V_{ig}$ of vignetting. That is, the correlative value C(0) calculated from the data row A in which the DC component in the in-focus state is not cut reflects the degree of lack of coincidence between the mutual patterns by vignetting alone.

The in-focus point cannot be accurately known from the data row A in which the DC component is not eliminated. On the other hand, the focus position detected by the utilization of the DC-cut data row B is substantially accurate and first, the in-focus point is found from the latter data row B, whereafter the correlative value C thereof is calculated by the utilization of the data row A which is not DC-cut, whereby it is possible to estimate approximately the amount $V_{ig}$ of vignetting even if the aforementioned lens data is unclear. Even if the interchangeable lens is in the non-in-focus state, the amount $V_{ig}$ of vignetting can be estimated by similar processing. That is, after the shift number $L_O$ which provides the in-focus has been calculated by the utilization of the data row B, the correlative value C to the shift number $L_O$ may be calculated by the data row A. At the aforementioned step 7-8, as described above, the DC-cut data row B is utilized to effect focus detection, whereafter for the shift number $L_O$ which provides the calculated in-focus position, $$C(L_O) = \sum_i |a_i - b_i + L_O|$$

is detected from the data row A in which the DC component is not cut.

By setting the coefficient k so that $V_{ig}=k \cdot C(L_O)$, it can be handled substantially equivalently to the amount $V_{ig}$ of vignetting calculated from the lens data and therefore, the processing algorithm is also easy.

How to set the threshold value at step 7-9 will now be described.

Generally, when there is no vignetting, there is found between the information amount and the focus detection accuracy such a relation that the product of the two is substantially constant irrespective of the object to be photographed.

When vignetting occurs, as the degree of vignetting becomes greater, this constant value increases. Accordingly, to ensure focus detection accuracy higher than a predetermined level, it is preferable to provide a certain threshold value so that when the information amount is below this threshold value, focus detection is impossible and the amount of defocus calculated at this time is not used for the display and the driving. This threshold value need be changed depending on at least the presence or absence of vignetting, and it is preferable to vary the threshold value depending also on the degree of vignetting if there is an allowance in the operation processing.

Also, as a matter of course, it is necessary to provide optimum threshold values TH(A) and TH(B) discretely for the result of steps 7-5 and 7-6 which have been subjected to different data processing.

Figure 10:
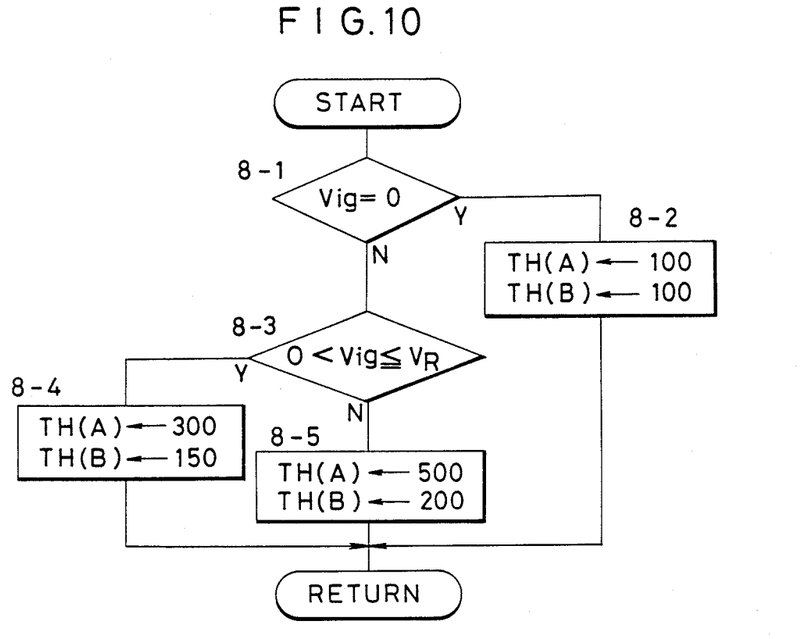
FIG. 10 is a flow chart of the subroutine of FIG. 7B.

The table below shows a specific example, and algorithm operation means 412 sets threshold values TH(A) and TH(B) corresponding to the amount $V_{ig}$ of vignetting as shown in the flow chart of FIG. 10 in accordance with such a table.

Vignetting level 0: no vignetting ($V_{ig}=0$)
Vignetting level 1: $0 < V_{ig} < V_R$
Vignetting level 2: $V_R < V_{ig}$

| | Vignetting level 0 | Vignetting level 1 | Vignetting level 2 |
|---|---|---|---|
| Threshold value TH(A) of information amount A | 100 | 300 | 500 |
| Threshold value TH(B) of information amount | 100 | 150 | 200 |

-continued

| | Vignetting level 0 | Vignetting level 1 | Vignetting level 2 |
|---|---|---|---|
| B | | | 5 |

When filter processing is to be effected at step 7-2, the focus detection operation using the content of the memory C suffers less from the deterioration of detection accuracy by vignetting and suffers less from the increase in the threshold values which results from an increase in vignetting.

Next, at steps 7-10, the threshold value TH(A) and the information amount E(A) calculated at step 7-5 are compared with each other and the threshold value TH(B) and the information amount E(B) calculated at step 7-6 are compared with each other, whereby the in-focus is decided.

When only one of them exceeds the threshold value, the result of the operation of the amount of defocus is the final result.

When both of them exceed the threshold values, the result of the amount of defocus operated at step 7-6 is the final result. Of course, when the information amount A is substantially greater than the information amount B, the defocus amount A may sometimes be higher in accuracy and therefore, which defocus amount should be the final result may be determined by the ratio of the two information amounts, or simply the average value of the defocus amount A and the defocus amount B may be determined as the final defocus amount.

We claim:

1. An improvement in a photo-taking lens removably mountable on a camera body that has means for receiving radiation from an object to be photographed through an optical system of said photo-taking lens, and vignetting detection means for calculating vignetting by said photo-taking lens with respect to radiation directed to said radiation receiving means on the basis of data supplied from said photo-taking lens, said photo-taking lens including:
   memory means for storing data therein, said data indicating an inverse of a value corresponding to the position of an exit pupil of said photo-taking lens along an optical axis of said photo-taking lens, and means for supplying data stored in said memory means to said calculating means.

2. An improvement according to claim 1, wherein said value corresponds to a distance from a focal plane of said photo-taking lens to said exit pupil.

3. An apparatus for detecting the in-focus state of a photo-taking lens of a camera on the basis of radiation from an object to be photographed passed through said photo-taking lens, said apparatus including:
   (a) light intensity distribution detecting means;
   (b) a detecting optical system for directing a part of the radiation from the object to be photographed passed through said photo-taking lens to said light intensity distribution detecting means, said light intensity distribution detecting means producing a light intensity distribution signal in response to the radiation directed by said detecting optical system;
   (c) defocus signal producing means responsive to said light intensity distribution signal to produce a defocus signal indicative of deviation between the image of the object to be photographed by said photo-taking lens and a predetermined surface;
   (d) information signal producing means for producing an information signal indicative of the effectiveness of said defocus signal;
   (e) vignetting detection means for producing a vignetting detection signal indicative of the state of vignetting by said photo-taking lens with respect to the radiation directed to said light intensity distribution detecting means by said detecting optical system; and
   (f) determining means for comparing said information signal with a threshold value to determine the effectiveness of the defocus indicated by said defocus signal, said determining means including means for changing said threshold value in response to said vignetting detection signal.

4. An apparatus according to claim 3, wherein said light intensity distribution detecting means has a detecting surface, said light intensity distribution signal is indicative of the light intensity distribution on said detecting surface, and said information signal producing means is responsive to said light intensity distribution signal to produce said information signal.

5. An apparatus according to claim 4, wherein said information signal is indicative of the contrast of the light intensity distribution on said detecting surface.

6. An apparatus according to claim 5, wherein said vignetting detection means calculates the amount of said vignetting, and said vignetting detection signal is indicative of the calculated amount of said vignetting.

7. An apparatus according to claim 6, wherein said photo-taking lens has memory means storing therein information regarding an optical system of said photo-taking lens, and said vignetting detection means is responsive to said memory means to calculate the amount of said vignetting.

8. An apparatus according to claim 7, wherein said memory means stores therein information regarding the distance from the exit pupil of said photo-taking lens to said detecting surface.

9. An improvement in a photo-taking lens removably mounted on a camera body that has a focus detecting optical system, focus detecting means for receiving radiation from an object to be photographed through an optical system of said photo-taking lens and said focus detecting optical system and for detecting deviation between an image of the object to be photographed and a predetermined plane, and vignetting detection means for calculating vignetting by said photo-taking lens with respect to radiation directed to said focus detecting means by said focus detecting optical system on the basis of data supplied from said photo-taking lens, said photo-taking lens including:
   memory means for storing data therein, said data indicating an inverse of a value indicative of a distance from said predetermined plane to an exit pupil of said photo-taking lens, and means for supplying data stored in said memory meas to said calculating means.

10. An apparatus for detecting the in-focus state of a photo-taking lens of a camera on the basis of radiation from an object to be photographed passed through said photo-taking lens, said apparatus including:
    (a) light intensity distribution detecting means;
    (b) a detecting optical system for directing a part of the radiation from the object to be photographed passed through said photo-taking lens to said light intensity distribution detecting means, said light intensity distribution detecting means producing a light intensity distribution signal in response to the radiation directed by said detecting optical system;

(c) defocus signal producing means for producing a defocus signal indicative of deviation between the image of the object to be photographed by said photo-taking lens and a predetermined surface on the basis of said light intensity distribution signal corresponding to spatial frequency components of a predetermined range;

(d) information signal producing means for producing an information signal indicative of the effectiveness of said defocus signal;

(e) vignetting detection means for producing a vignetting detection signal indicative of the state of vignetting by said photo-taking lens with respect to the radiation directed to said light intensity distribution detecting means by said detecting optical system;

(f) another defocus signal producing means for producing another defocus signal indicative of deviation between the image of the object to be photographed by said photo-taking lens and a predetermined surface on the basis of said light intensity distribution signal which has a spatial frequency component outside said predetermined range;

(g) another information signal producing means for producing another information signal indicative of the effectiveness of said another defocus signal; and (h) determining means for comparing the first-mentioned information signal with a threshold value to determine the effectiveness of the defocus indicated by said defocus signal, and for comparing said another information signal with another threshold value to determine the effectiveness of the defocus indicated by said another defocus signal, said determining means including means responsive to said vignetting signal for changing the first-mentioned threshold value and said another threshold value.

11. An apparatus according to claim 10, wherein said light intensity distribution detecting means has a detecting surface, said light intensity distribution signal is indicative of the light intensity distribution on said detecting surface, said information signal means is responsive to said light intensity distribution signal to produce said information signal, and said another information signal producing means is responsive to said light intensity distribution signal to produce said another information signal by processing different from that of said information signal producing means.

12. An apparatus according to claim 11, wherein said information signal and said another information signal are indicative of the contrast of the light intensity distribution on said detecting surface.

13. An apparatus according to claim 12, wherein said defocus signal producing means and said information signal producing means are responsive to said light intensity distribution signal from which a predetermined spatial frequency component is eliminated, and said another defocus signal producing means and said another information signal producing means are responsive to said light intensity distribution signal from which a spatial frequency component different from said predetermined spatial frequency component is eliminated.

14. A camera body on which is mountable a first photo-taking lens provided with memory means storing therein optical information regarding an optical system and a second photo-taking lens not provided with said memory means, said camera body including:

(a) light intensity distribution detecting means;

(b) a detecting optical system for directing a part of the radiation from an object to be photographed passed through said first or said second photo-taking lens to said light intensity distribution detecting means, said light intensity distribution detecting means producing a light intensity distribution signal in response to the radiation directed by said detecting optical system;

(c) defocus signal producing means responsive to said light intensity distribution signal to produce a defocus signal indicative of deviation between the image of the object to be photographed by said first or said second photo-taking lens and a predetermined surface;

(d) information signal producing means for producing an information signal indicative of the effectiveness of said defocus signal;

(e) first vignetting detection means responsive to said optical information in said memory means to detect the vignetting by said first photo-taking lens with respect to the radiation directed to said light intensity distribution detecting means by said detecting optical system, and produce a first vignetting detection signal;

(f) second vignetting detection means for detecting on the basis of said light intensity distribution signal the vignetting by said second photo-taking lens with respect to the radiation directed to said light intensity distribution detecting means by said detecting optical system, and producing a second vignetting detection signal;

(g) determining means for determining the effectiveness of the defocus indicated by said defocus signal in response to said information signal; and (h) control means responsive to said first vignetting detection signal to control said determining means when said first photo-taking lens is mounted on said camera body, and responsive to said second vignetting detection signal to control said determining means when said second photo-taking lens is mounted on said camera body.

15. A camera body according to claim 14, wherein said light intensity distribution detecting means has a detecting surface, said light intensity distribution signal is indicative of the light intensity distribution on said detecting surface, and said information signal producing means is responsive to said light intensity distribution signal to produce said information signal.

16. A camera body according to claim 15, wherein said information signal is indicative of the contrast of the light intensity distribution on said detecting surface.

17. A camera body according to claim 16, wherein said determining means compares said information signal with a threshold value.

18. A camera body according to claim 17, wherein said control means is responsive to said first vignetting detection signal to change said threshold value when said first photo-taking lens is mounted on said camera body, and responsive to said second vignetting detection signal to change said threshold value when said second photo-taking lens is mounted on said camera body.

19. A camera body according to claim 18, wherein said first and second vignetting detection signals are indicative of the amounts of vignetting, respectively.

20. A camera system comprising:
a camera body; and
a photo-taking lens removably mountable on said camera body and having memory means for storing data therein, said data indicating an inverse of a value indicative of a distance from a predetermined plane to an exit pupil of said photo-taking lens;
said camera body having a focus detecting optical system, focus detecting means for receiving radiation from an object to be photographed through an optical system of said photo-taking lens and said focus detecting optical system and for detecting deviation between an image of the object to be photographed and said predetermined plane, and vignetting detection means for calculating vignetting by said photo-taking lens with respect to radiation directed to said focus detecting means by said focus detecting optical system on the basis of data stored in said memory means.

21. A camera system according to claim 20, wherein said predetermined plane is coincident with a focal plane of said photo-taking lens.

* * * * *